United States Patent [19]

Viessmann

[11] 4,327,672
[45] * May 4, 1982

[54] FUEL BURNING BOILER

[76] Inventor: Hans Viessmann, Im Hain, D-3559 Battenberg, Eder, Fed. Rep. of Germany

[*] Notice: The portion of the term of this patent subsequent to Mar. 11, 1997, has been disclaimed.

[21] Appl. No.: 120,899

[22] Filed: Feb. 12, 1980

[30] Foreign Application Priority Data

| Feb. 19, 1979 [DE] | Fed. Rep. of Germany | 2906362 |
| Jun. 13, 1979 [DE] | Fed. Rep. of Germany | 2923832 |
| Dec. 5, 1979 [DE] | Fed. Rep. of Germany | 2948864 |
| Dec. 5, 1979 [DE] | Fed. Rep. of Germany | 2948905 |

[51] Int. Cl.³ .......................... F22B 7/00; F22B 31/00
[52] U.S. Cl. .................... 122/136 R; 122/367 R; 122/136 C
[58] Field of Search .......... 122/136 R, 136 C, 367 R, 122/367 C, 367 A, 149, 51, 74

[56] References Cited

U.S. PATENT DOCUMENTS

| 3,171,388 | 3/1965 | Ganz | 122/367 R |
| 4,102,309 | 7/1978 | Viessmann | 122/136 R |
| 4,157,698 | 6/1979 | Viessmann | 122/136 R |
| 4,169,431 | 10/1979 | Viessmann | 122/136 R |
| 4,192,259 | 3/1980 | Viessmann | 122/136 C |

FOREIGN PATENT DOCUMENTS 21081  8/1905  Austria .................. 122/136 C

Primary Examiner—Henry C. Yuen
Attorney, Agent, or Firm—Kurt Kelman

[57] ABSTRACT

A fuel burning boiler comprises a water holding shell of sheet steel having front and rear walls defining axially aligned openings. An insert body passes through the openings and is affixed thereto, the water being held between the shell and insert body. The insert body includes a cast iron casing providing a combustion chamber in the interior thereof, defining ducts for combustion gases of the fuel burnt in the combustion chamber and a smoke box at the rear wall and in communication with the ducts for receiving the combustion gases therefrom, and a sheet steel casing forming a skin over the cast iron casing and tightly fitting thereover. The sheet steel casing is fluid tightly connected with the front and rear walls of the shell around the rims of the opening therein.

22 Claims, 13 Drawing Figures

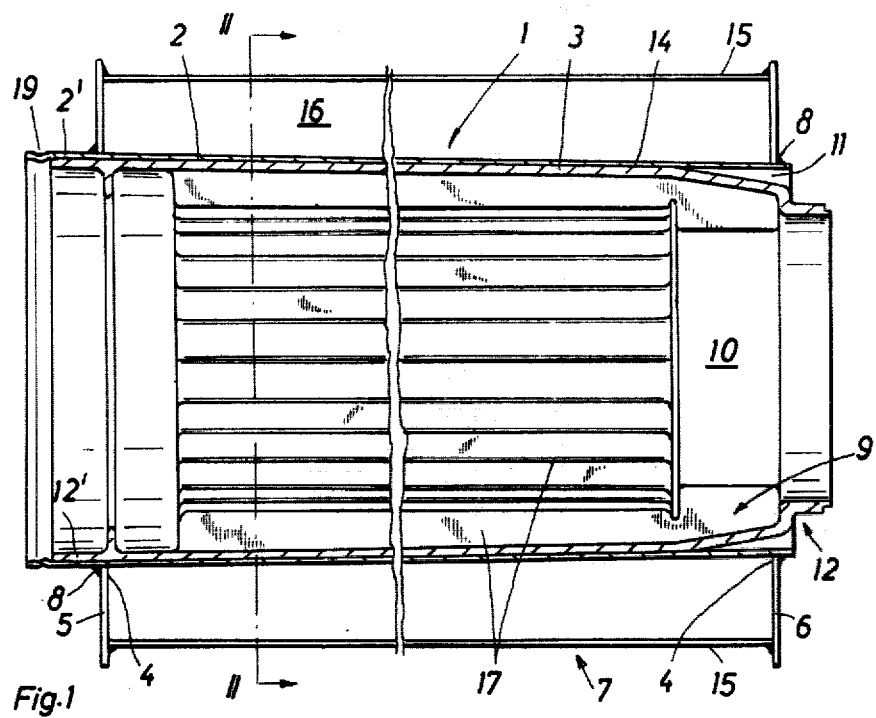
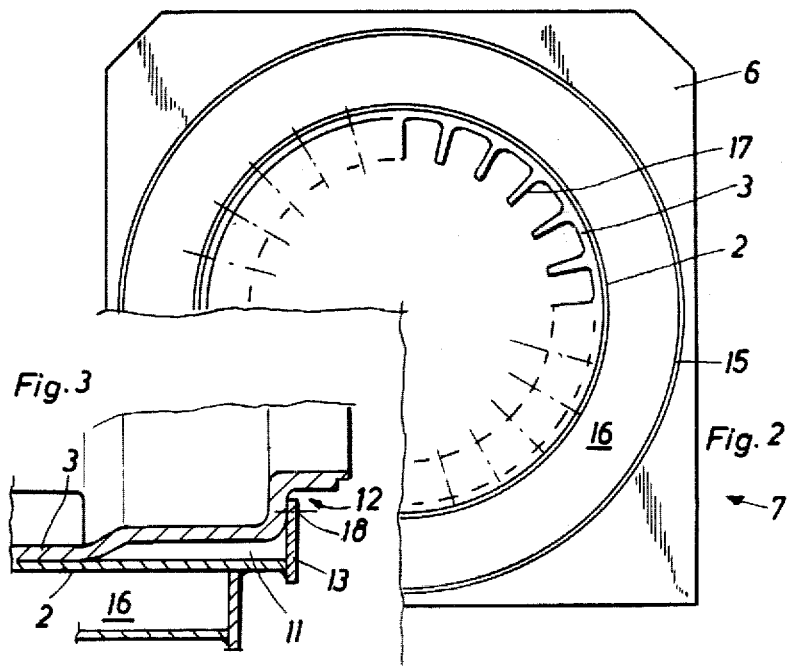
Fig.1
Fig.2
Fig.3

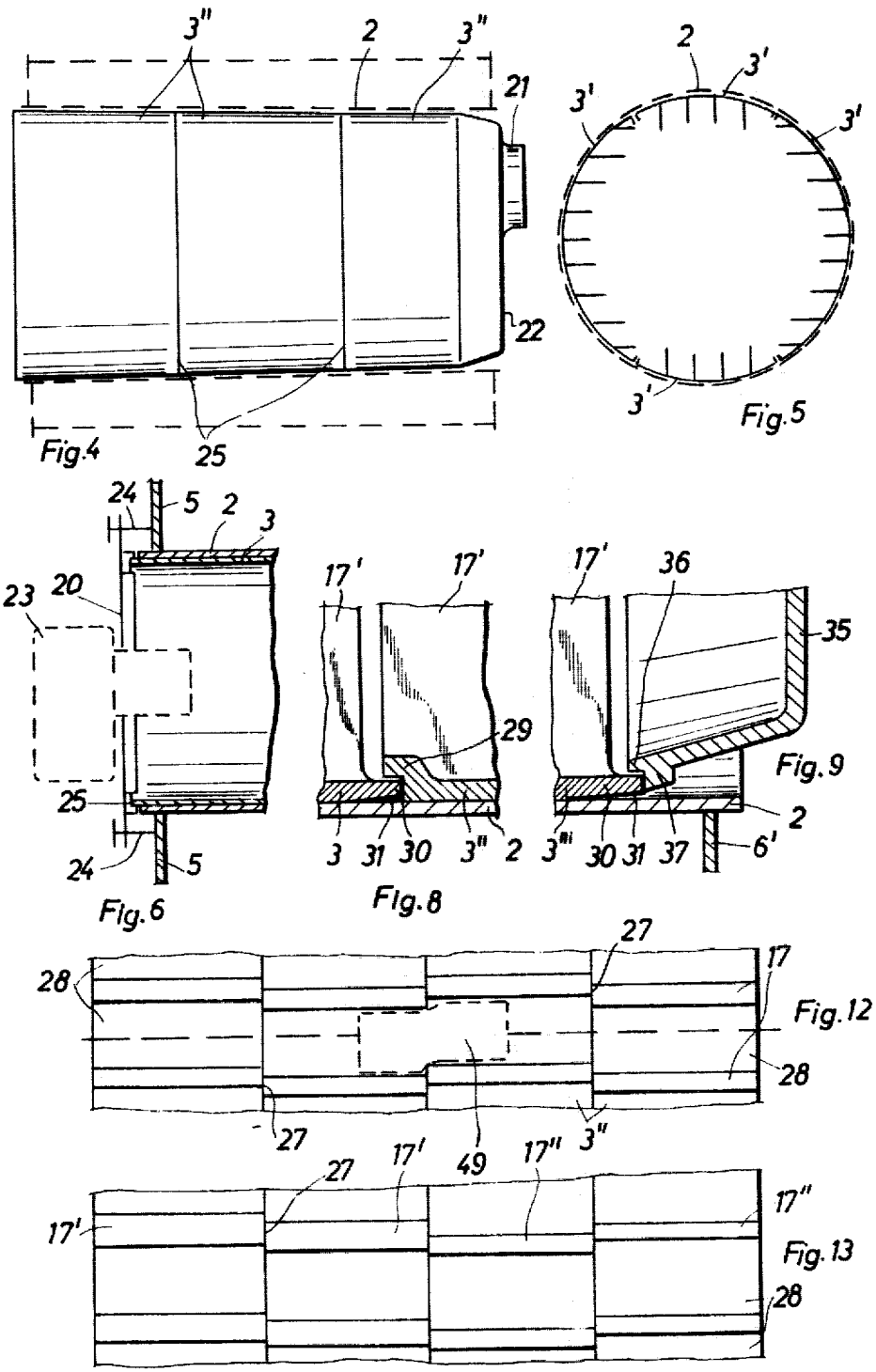

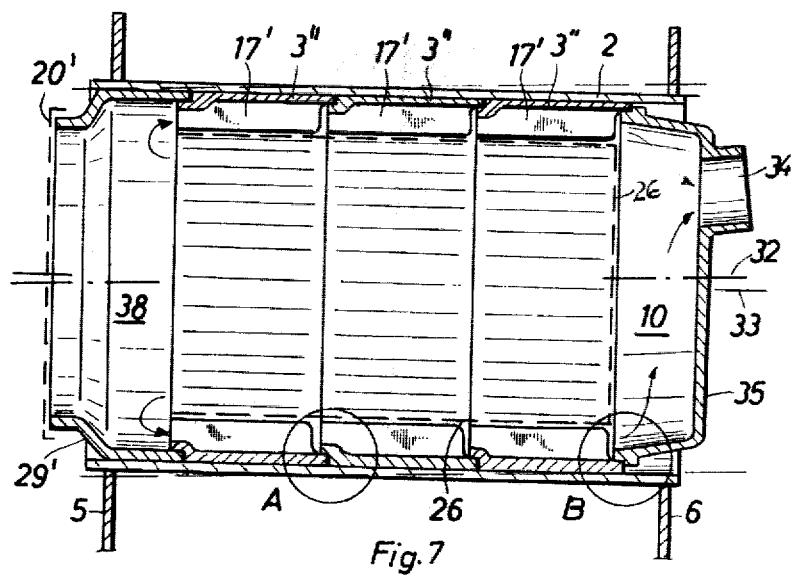
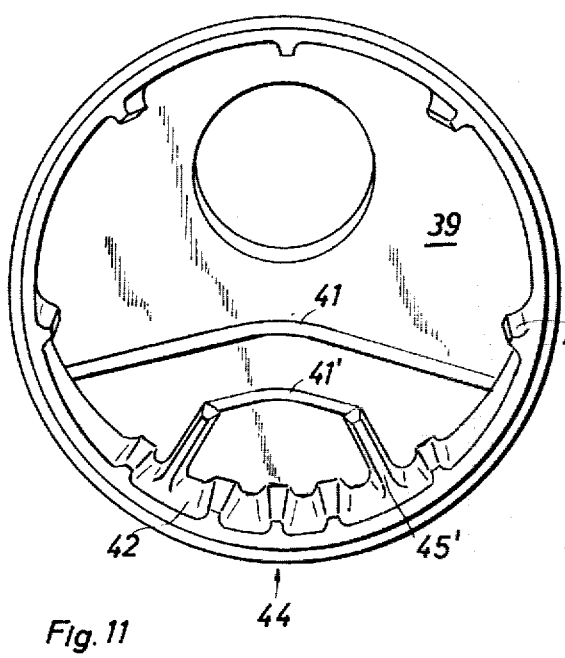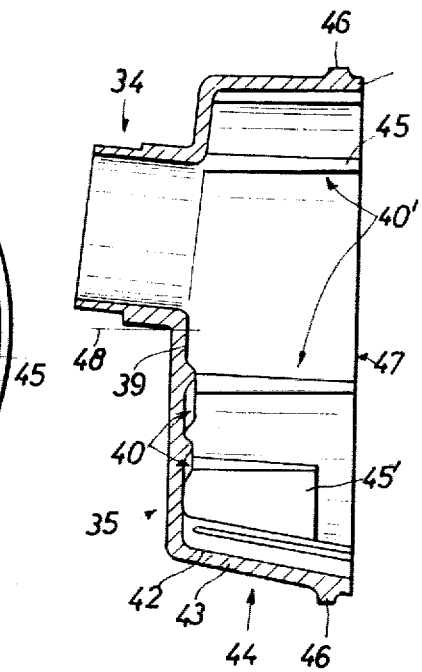

FUEL BURNING BOILER

The present invention relates to a gaseous or liquid fuel burning boiler comprising a water holding shell of sheet steel having a front wall and a rear wall, the front and rear walls defining axially aligned openings, and an insert body passing through the openings and affixed thereto, the water being held between the shell and insert body.

My U.S. Pat. No. 4,157,698, dated June 12, 1979, discloses a boiler of this type wherein the insert body is a cast iron casing. Such boilers are designed to operate with a gliding temperature and condensate is likely to form on the cast iron casing in the lower temperature operating range.

To manage the liquid condensate, it is important to provide a fluid tight connection between the cast iron insert and the sheet steel shell. While this critical connection has been satisfactorily provided by the construction disclosed in my patent, the connecting structure is somewhat cumbersome and the manufacture is, therefore, correspondingly expensive.

It is the primary object of this invention to overcome this disadvantage and to provide a boiler of the indicated type which avoids a connection between different materials, such as sheet steel and cast iron, and thus to simplify and improve the boiler construction.

The above and other objects are accomplished according to the invention with an insert body which includes a cast iron casing providing a combustion chamber in the interior thereof, defining ducts for combustion gases of the fuel burnt in the combustion chamber, and a smoke box at the rear wall of the sheet steel shell and in communication with the ducts for receiving the combustion gases therefrom, and a sheet steel casing forming a skin over the cast iron casing and tightly fitting thereover, the sheet steel casing being fluid tightly connected with the front and rear walls of the shell around the rims of the openings therein.

Depending on the accuracy of the casting, the outer surface of the cast iron casing may be machined, which does not substantially increase the manufacturing costs since no machining is required for any flange connections on the cast iron casing. If desired, the wall thickness of the cast iron casing may be decreased and there are no connections at all between sheet steel and cast iron.

Preferably, the cast iron and sheet steel casings are tubes of gradually diminishing diameters from the front towards the rear wall, i.e. they converge in a frusto-conical shape, and the sheet steel casing is shrunk onto the cast iron casing while warm.

In accordance with a preferred feature, the cast iron casing is composed of a plurality of axially aligned identical rings having respective ends adjacent each other, which has the advantage of requiring only relatively small casting molds for the rings, enabling them to be cast "green" and without a core.

The above and other objects, advantages and features of the present invention will become more apparent from the following detailed description of certain now preferred embodiments thereof, taken in conjunction with the accompanying drawing wherein FIG. 1 shows one embodiment of the boiler in axial section;

FIG. 2 is a section along line II—II of FIG. 1, with the lower quarter of the boiler cut away to make room for;

FIG. 3 showing an enlarged sectional view of a modified detail of one end of the boiler of FIG. 1;

FIG. 4 is a side elevational view showing another embodiment of the insert body;

FIG. 5 is a diagrammatic end view of still another embodiment of the insert body;

FIG. 6 is an axial section of an end of the boiler opposite to the end illustrated in FIG. 3 and showing a modified embodiment thereof;

FIG. 7 is a view similar to that of FIG. 1 and showing a further embodiment of the boiler;

FIG. 8 is an enlarged view of the detail indicated by A in FIG. 7;

FIG. 9 is an enlarged view of the detail indicated by B in FIG. 7;

FIG. 10 is an enlarged and more detailed view of a closure element shown in FIG. 7;

FIG. 11 is an inside plan view of the closure element of FIG. 10;

FIG. 12 is a plan view of a developed portion of the inner surface of one arrangement of the cast iron casing rings of the embodiment of FIG. 4 or 7; and FIG. 13 is a like view showing a modified arrangement.

Referring now to the drawing and first to FIGS. 1 and 2, there is shown a fuel burning boiler comprising water holding shell 7 of sheet steel. The shell has front wall 5 and rear wall 6, the front and rear walls defining axially aligned openings with rims 4, and axially extending shell wall 15 whose ends are welded to the front and rear walls. Insert body 1 passes through the openings and is affixed thereto, the water being held in annular space 16 between the shell and the insert body. Water inlet and outlet pipes (not shown) are connected to shell 7 for circulating the water therethrough in a manner well known in boilers of this type.

Insert body 1 includes cast iron casing 3 providing, as will be explained more fully hereinafter, a combustion chamber in the interior thereof, defining ducts for combustion gases of the fuel burnt in the combustion chamber, and smoke box 10 at rear wall 6 and in communication with the ducts for receiving the combustion gases therefrom. Sheet steel casing 2 forms a skin over cast iron casing 3 and fits tightly thereover. The sheet steel casing is fluid tightly connected with front and rear walls 5 and 6 of shell 7 around rims 4 of the openings therein by welds 8.

In the illustrated embodiment, cast iron and sheet steel casings 3 and 2 are tubes of gradually diminishing diameters from the front towards the rear wall, the tubular casings being of frusto-conical shape and having converging walls.

In the manufacture of the boiler, the insert body is first finished by shrinking tubular sheet steel casing 2 onto cast iron casing 3, and this unit is slid through the opening in the front wall and seated therein with one end while the other end thereof is seated in the opening in the rear wall, whereupon welds 8 are applied to interconnect the sheet steel parts of shell 7 and insert body 1. No fluid tight connection is required between cast iron and sheet steel parts.

As shown in FIGS. 1 and 3, the cast iron and sheet steel casings define a narrow annular space therebetween at rear wall 6. In the embodiment of FIG. 1, outer surface 14 of cast iron casing 3 is inwardly tapered at end portion 9 defining smoke box 10 to define the annular space. In the embodiment of FIG. 3, the end portion is radially inwardly offset to define annular space 11 between sheet steel casing 2 and cast iron casing 3 at the rear wall. This annular space aids in the prevention of liquid condensate because it enables the corresponding end portion of the cast iron casing to be heated much more quickly each time the fuel burner (not shown in FIG. 1) is started. This is important because the combustion gases have a reduced temperature in the adjacent smoke box after they have passed through the ducts defined by a series of radially inwardly extending ribs 17 distributed over the inner surface of casing 3. In the absence of space 11, heating of end portion 9 of the cast iron casing would take much longer, causing formation of liquid condensate.

As shown in FIG. 3, connecting means affixes the ends of the cast iron and sheet steel casings at rear wall 6 to each other to fix the two casings in relation to each other in view of the different thermal expansion coefficients of their materials. The illustrated connecting means is a retaining ring 13 welded to sheet steel casing 2 and screwed to cast iron casing 3 at 18. The retaining ring covers annular space 11.

One end 12 of the cast iron casing leads from smoke box 10 to the flue while other end 12' provides an opening for receiving a fuel burner. In the embodiment of FIG. 1, the end of sheet steel casing 2 corresponding to cast iron casing end 12' projects beyond end 12' and is corrugated at 19. It may be desirable to machine outer surface 14 of cast iron casing 3.

In another embodiment shown in FIG. 6, the end of cast iron casing 3 at front wall 5 projects beyond a corresponding end of sheet steel casing 2 and forms collar 25 and closure door 20 is mounted on the collar for closing off the interior of the cast iron casing. Fuel burner unit 23 (schematically shown in broken lines) is mounted on door 20. Mounting elements 24 hold door 20 on front wall 5 and press it against collar 25.

The arrangement of a tubular cast iron casing within a sheet steel casing has the considerable advantage of enabling the inner cast iron casing to be composed of a plurality of like case elements which are adjacent to each other to form the casing. In the embodiment schematically illustrated in FIG. 5, the casing elements are elongated segments 3' extending in an axial direction.

In the embodiment shown in FIGS. 4 and 7, the casing elements are a plurality of axially aligned rings 3" having respective ends adjacent each other. The like casing segments or rings may be cast "green" in relatively small molds and may be united into the casing before the sheet steel casing is mounted thereover or they may be singly introduced into the sheet steel casing to form the cast iron casing therein.

In the embodiment of FIG. 4, rings 3" of cast iron casing 3 include an end ring at the rear wall of the sheet steel shell, the end ring including end wall 22 and defining the smoke box, and flue pipe 21 cast integrally with the end wall. This, of course, requires a special mold for the end ring. On the other hand, if preferred, the end ring at the rear wall may not differ from the other rings and a closure as shown in FIG. 6 at the front wall may be provided.

As shown in FIGS. 7-9, the cast iron casing rings have a series of radially inwardly extending ribs 17' defining therebetween the ducts for the combustion gases, the ribs being substantially equidistantly spaced around the periphery of the interior of the cast iron casing. The number of cast iron casing rings 3" will depend, of course, on the total length of the boiler and the length of each ring. As best shown in FIG. 8, one end of each ring facing front wall 5 forms radially inwardly offset collar 29 defining an annular recess with sheet steel casing 2 and the other end 30 of each adjacent ring 3" fits into the recess. Each rib 17' is recessed at other end 30 to permit collar 29 of the adjacent ring to overlap end 30. Outer surface 31 of other end 30 tapers radially inwardly away from sheet steel casing 2 for reasons explained hereinabove in connection with annular space 11.

In the embodiment of FIG. 7, fire box 26 (shown in broken lines) is inserted into the interior of the cast iron casing and the fire box has an end wall separating it from smoke box 10. In this manner, the combustion gases are reflected by the end wall of the fire box and forced (see arcuate arrows) over the open front end of the fire box into the ducts defined between ribs 17' and leading into smoke box 10.

The surfaces of cast iron casing rings 3" need not be machined, except for the seats of the rings. If desired, empty spaces at the abutting ends of the rings may be filled with a heat-resistant sealing mass.

As shown in FIG. 7, a front end ring of the cast iron casing defining flue chamber 38, through which the combustion gases pass from fire box 26 into the ducts between ribs 17', forms radially inwardly offset collar 29' of considerably larger dimensions than collar 29, collar 29' being designed to receive closure 20' (shown in broken lines).

At the opposite end, a rear end ring of the cast iron casing defining smoke box 10 constitutes a substantially pan-shaped closure element at rear wall 6. The closure element has end wall 35 and a side wall having at least a lower portion inclined from the end wall towards the front wall. The side wall has collar 37 which engages adjacent end 30 of the cast iron casing, rim 36 of the side wall overlapping end 30. The fit of the closure element with the adjacent cast iron casing ring is equivalent to the fit between the casing rings. Similar to the embodiment of FIG. 4, the closure element has flue pipe 34 integrally cast therewith.

As illustrated in FIG. 7, insert body 1 has a longitudinal axis 32 downwardly inclined in relation to horizontal 33 towards front wall 5. This may be accomplished by inclining the entire boiler in this manner or merely by so inclining the insert body in relation to shell 7. This results in causing any condensate formed on the insert body in critical areas to flow always forwardly, i.e. in the direction where the boiler is at a higher temperature in the neighborhood of the fuel burner, and not to collect in crevices between the casing rings.

While not shown in the drawing, suitable connecting means, such as shown in FIG. 3, retain the pan-shaped closure element in position in relation to the sheet steel shell.

As illustrated in FIGS. 10 and 11, inner surface 39 of end wall 35 of the cast iron closure element has liquid condensate guide means 40 arranged thereon. The illustrated guide means is constituted by relatively flat ridges 40, 41' on inner surface 39, each ridge having an apex intermediate side wall 43 and two portions descending from the apex towards lower portion 44 of the side wall. These ridges may be pointed or arcuate. Furthermore, inner surface 42 of side wall 43 has liquid condensate guide means 40' comprising ribs 45, 45' extending from inner surface 39 of end wall 35 towards the interior of the cast iron casing to open end 47 of the closure element. Ribs 45 above ridges 41, 41' are inclined. The ridges and ribs are heated more quickly than the walls of the closure element and thus tend to evaporate condensate flowing into the lower portion 44 of the closure element. Thus, any liquid condensate is prevented from accumulating and tends to be constantly evaporated by quickly heated elements with which it comes into contact. The inclination of the ribs tends to cause the condensate to drip down into hotter areas of the boiler. The desired condensate flow in the closure element is further improved when the longitudinal axis thereof is downwardly inclined in relation to horizontal 48 towards the front wall, as indicated in FIG. 10.

Instead of fitting the cast iron closure element on the cast iron casing in the illustrated manner, the closure element may be constituted by a door hinged to the casing.

FIGS. 12 and 13 schematically illustrate specific arrangements of cast iron casing rings 3″, adjacent ones of the rings being so arranged in the sheet steel casing that ribs 17′ of the adjacent rings are circumferentially offset by less than a width of the ribs. This forms shoulders 27 between abutting ribs and produces zones of turbulence in ducts 28 through which the combustion gases flow between the ribs. The offset between abutting ribs 17′ is preferably such that the ribs define continuous ducts 28 for the combustion gases passing through the cast iron casing to the smoke box, enabling a cleaning element 49 to be pulled through the ducts, the cleaning element being indicated only schematically in broken lines in FIG. 12. As shown in FIG. 13, the width of ribs 17′, 17″ preferably decreases towards the smoke box, which not only saves material but also takes into account the temperature gradient along the axis of the boiler.

What is claimed is:

1. A fuel burning boiler comprising
  (a) a water holding shell of sheet steel, the shell having
    (1) a front wall and
    (2) a rear wall, the front and rear walls defining axially aligned openings, and
  (b) an insert body passing through the openings and affixed thereto, the water being held between the shell and the insert body, and the insert body including
    (1) a cast iron casing providing a combustion chamber in the interior thereof having a series of radially inwardly extending ribs defining therebetween ducts for combustion gases of the fuel burnt in the combustion chamber, and a smoke box at the rear wall and in communication with the ducts for receiving the combustion gases therefrom, and
    (2) a sheet steel casing forming a skin over the cast iron casing and tightly fitting thereover, the sheet steel casing being fluid tightly connected with the front and rear walls of the shell around the rims of the openings therein.

2. The fuel burning boiler of claim 1, wherein the cast iron and sheet steel casings are tubes of gradually diminishing diameters from the front towards the rear wall.

3. The fuel burning boiler of claim 1 or 2, wherein the cast iron and sheet steel casings define a narrow space therebetween at the rear wall.

4. The fuel burning boiler of claim 3, further comprising connecting means affixing the ends of the cast iron and sheet steel casings at the rear wall to each other.

5. The fuel burning boiler of claim 1 or 2, wherein an end of the sheet steel casing at the front wall is corrugated.

6. The fuel burning boiler of claim 1 or 2, wherein the outer surface of the cast iron casing is machined.

7. The fuel burning boiler of claim 1 or 2, wherein an end of the cast iron casing at the front wall projects beyond a corresponding end of the sheet steel casing, the projecting cast iron casing end forming a collar, and further comprising a closure door mounted on the collar for closing off the interior of the cast iron casing and a fuel burner unit mounted on the door.

8. The fuel burning boiler of claim 1 or 2, wherein the cast iron casing is composed of a plurality of adjacent casing segments.

9. The fuel burning boiler of claim 1, wherein the cast iron casing is composed of a plurality of axially aligned rings having respective ends adjacent each other.

10. The fuel burning boiler of claim 9, wherein the rings of the cast iron casing include an end ring at the rear wall, the end ring including an end wall and defining the smoke box, and a flue pipe is cast integrally with the end wall.

11. The fuel burning boiler of claim 9, wherein one of the ends of the cast iron casing rings facing the front wall forms a radially inwardly offset collar defining a recess with the sheet steel casing, the other end of each adjacent ring fitting into the recess.

12. The fuel burning boiler of claim 11, wherein the outer surface of the other end tapers radially inwardly away from the sheet steel casing.

13. The fuel burning boiler of claim 11 or 12, wherein the insert body has a longitudinal axis downwardly inclined in relation to the horizontal towards the front wall.

14. The fuel burning boiler of claim 1 or 9, wherein the cast iron casing comprises a substantially pan-shaped closure element at the rear wall, the closure element including an end wall and a side wall having a lower portion inclined from the end wall towards the front wall, the inner surface of the end wall having a liquid condensate guide means arranged thereon.

15. The fuel burning boiler of claim 14, wherein the guide means is constituted by a ridge on the inner surface, the guide means ridge having an apex intermediate the side wall and two portions descending from the apex towards the lower portion of the side wall.

16. The fuel burning boiler of claim 14, wherein the inner surface of the side wall has liquid condensate guide means comprising ribs extending from the inner surface of the end wall towards the interior of the cast iron casing.

17. The fuel burning boiler of claim 14, further comprising a collar on the side wall of the closure element, the collar engaging an adjacent end of the cast iron casing.

18. The fuel burning boiler of claim 14, wherein the closure element has a longitudinal axis downwardly inclined in relation to the horizontal towards the front wall.

19. The fuel burning boiler of claim 14, wherein the guide means comprises a ridge on the inner surface of the end wall, the ridge having an apex intermediate the side wall and two portions descending from the apex towards the lower portion of the side wall, and ribs on the inner surface of the side wall extending from the inner surface of the end wall towards the interior of the cast iron casing, the ribs on the inner surface of the side wall arranged above the ridge on the inner surface of the end wall being inclined.

20. The fuel burning boiler of claim 1, wherein the ribs of adjacent ones of the cast iron casing in the sheet steel casing that the ribs of the adjacent rings are circumferentially offset by less than a width of the ribs.

21. The fuel burning boiler of claim 20, wherein the ribs are offset so that they define continuous ducts for the combustion gases passing through the cast iron casing to the smoke box.

22. The fuel burning boiler of claim 20 or 21, wherein the width of the ribs decreases towards the smoke box.

* * * * *